United States Patent
Manion et al.

(10) Patent No.: US 7,613,812 B2
(45) Date of Patent: Nov. 3, 2009

(54) PEER-TO-PEER IDENTITY MANAGEMENT INTERFACES AND METHODS

(75) Inventors: Todd R. Manion, Redmond, WA (US); Robert D. Donner, Sammamish, WA (US); Grigori M. Somin, Renton, WA (US)

(73) Assignee: Microsoft Corporation, Redmond, WA (US)

( * ) Notice: Subject to any disclaimer, the term of this patent is extended or adjusted under 35 U.S.C. 154(b) by 760 days.

(21) Appl. No.: 10/309,864

(22) Filed: Dec. 4, 2002

(65) Prior Publication Data
US 2004/0111515 A1 Jun. 10, 2004

(51) Int. Cl.
*G06F 15/16* (2006.01)
(52) U.S. Cl. .................. 709/227; 709/228; 709/229
(58) Field of Classification Search .......... 709/227–229
See application file for complete search history.

(56) References Cited

U.S. PATENT DOCUMENTS

| | | | |
|---|---|---|---|
| 5,369,705 A | 11/1994 | Bird et al. | |
| 5,371,794 A | 12/1994 | Diffie et al. | |
| 5,386,542 A | 1/1995 | Brann et al. | |
| 5,712,914 A | 1/1998 | Aucsmith et al. | |
| 5,748,736 A | 5/1998 | Mittra | |
| 5,761,421 A | 6/1998 | van Hoff et al. | |
| 5,806,075 A | 9/1998 | Jain et al. | |
| 5,832,514 A | 11/1998 | Norin et al. | |
| 5,854,898 A | 12/1998 | Riddle | |
| 5,901,227 A | 5/1999 | Perlman | |
| 5,907,685 A | 5/1999 | Douceur | |
| 5,917,480 A | 6/1999 | Tafoya et al. | |
| 5,922,074 A | 7/1999 | Richard et al. | |
| 5,933,849 A | 8/1999 | Srbljic et al. | |

(Continued)

FOREIGN PATENT DOCUMENTS

EP 1248441 10/2002

(Continued)

OTHER PUBLICATIONS

Adam Langley, *The Freenet Protocol*, The Free Network Project, at http://freenet.sourceforge.net/index.php?page=protocol (last visited May 21, 2001).

(Continued)

*Primary Examiner*—Nathan J Flynn
*Assistant Examiner*—Mohamed Wasel
(74) *Attorney, Agent, or Firm*—Marshall, Gerstein & Borun LLP

(57) ABSTRACT

Peer-to-peer (P2P) application programming interfaces (APIs) that allow an application to create, import, export, manage, enumerate, and delete P2P identities are presented. Further, the management of group identity information is provided. APIs abstract away from low level credential and cryptographic functions required to create and manage P2P identities. This management includes retrieval and setting of a friendly name, generation of a cryptographic public/private key pair, retrieval of security information in the form of an XML fragment, and creation of a new name based on an existing identity. Since the P2P environment also allows for the existence of multiple separate groups of peers within the P2P cloud, a preferred embodiment of the present invention also allows for the enumeration of all groups associated with a given identity, for each identity existing for the user.

12 Claims, 2 Drawing Sheets

U.S. PATENT DOCUMENTS

| | | | |
|---|---|---|---|
| 5,944,794 A * | 8/1999 | Okamoto et al. | 709/225 |
| 5,982,898 A | 11/1999 | Hsu et al. | |
| 5,987,376 A | 11/1999 | Olson et al. | |
| 6,012,096 A | 1/2000 | Link et al. | |
| 6,016,505 A | 1/2000 | Badovinatz et al. | |
| 6,044,350 A | 3/2000 | Weiant, Jr. et al. | |
| 6,078,948 A | 6/2000 | Podgorny et al. | |
| 6,081,845 A | 6/2000 | Kanemaki et al. | |
| 6,085,320 A | 7/2000 | Kaliski, Jr. | |
| 6,088,805 A | 7/2000 | Davis et al. | |
| 6,092,201 A | 7/2000 | Turnbull et al. | |
| 6,097,811 A | 8/2000 | Micali | |
| 6,108,687 A | 8/2000 | Craig | |
| 6,128,740 A | 10/2000 | Curry et al. | |
| 6,134,658 A | 10/2000 | Multerer et al. | |
| 6,141,760 A | 10/2000 | Abadi et al. | |
| 6,148,383 A | 11/2000 | Micka et al. | |
| 6,155,840 A | 12/2000 | Sallette | |
| 6,163,809 A | 12/2000 | Buckley | |
| 6,205,481 B1 | 3/2001 | Heddaya et al. | |
| 6,216,110 B1 | 4/2001 | Silverberg | |
| 6,237,025 B1 | 5/2001 | Ludwig | |
| 6,266,420 B1 | 7/2001 | Langford et al. | |
| 6,269,099 B1 | 7/2001 | Borella et al. | |
| 6,311,209 B1 | 10/2001 | Olson et al. | |
| 6,336,141 B1 | 1/2002 | Fujiyama et al. | |
| 6,351,813 B1 | 2/2002 | Mooney et al. | |
| 6,363,352 B1 | 3/2002 | Dailey et al. | |
| 6,470,375 B1 * | 10/2002 | Whitner et al. | 718/105 |
| 6,490,253 B1 | 12/2002 | Miller et al. | |
| 6,526,411 B1 | 2/2003 | Ward | |
| 6,529,950 B1 | 3/2003 | Lumelsky et al. | |
| 6,532,217 B1 | 3/2003 | Alkhatib et al. | |
| 6,560,636 B2 | 5/2003 | Cohen et al. | |
| 6,581,110 B1 | 6/2003 | Harif et al. | |
| 6,636,854 B2 | 10/2003 | Dutta et al. | |
| 6,636,889 B1 | 10/2003 | Estrada et al. | |
| 6,653,933 B2 | 11/2003 | Raschke et al. | |
| 6,654,796 B1 | 11/2003 | Slater et al. | |
| 6,658,568 B1 | 12/2003 | Ginter et al. | |
| 6,675,205 B2 | 1/2004 | Meadway et al. | |
| 6,675,261 B2 * | 1/2004 | Shandony | 711/121 |
| 6,683,865 B1 | 1/2004 | Garcia-Luna-Aceves et al. | |
| 6,701,344 B1 | 3/2004 | Holt et al. | |
| 6,714,966 B1 | 3/2004 | Holt et al. | |
| 6,728,753 B1 | 4/2004 | Parasnis et al. | |
| 6,745,178 B1 | 6/2004 | Emens et al. | |
| 6,748,530 B1 | 6/2004 | Aoki | |
| 6,754,829 B1 | 6/2004 | Butt et al. | |
| 6,775,782 B1 | 8/2004 | Buros et al. | |
| 6,791,582 B2 | 9/2004 | Linsey et al. | |
| 6,801,604 B2 | 10/2004 | Maes et al. | |
| 6,823,327 B1 * | 11/2004 | Klug et al. | 707/1 |
| 6,912,622 B2 | 6/2005 | Miller | |
| 6,920,455 B1 | 7/2005 | Weschler | |
| 6,968,179 B1 | 11/2005 | De Vries | |
| 6,976,258 B1 | 12/2005 | Goyal et al. | |
| 6,981,043 B2 * | 12/2005 | Botz et al. | 709/225 |
| 6,983,400 B2 | 1/2006 | Volkov | |
| 6,990,514 B1 | 1/2006 | Dodrill et al. | |
| 7,062,681 B2 | 6/2006 | Larsson et al. | |
| 7,065,587 B2 | 6/2006 | Huitema et al. | |
| 7,068,789 B2 | 6/2006 | Huitema et al. | |
| 7,073,132 B1 | 7/2006 | Rydahl et al. | |
| 7,130,999 B2 | 10/2006 | Yasala et al. | |
| 7,139,760 B2 | 11/2006 | Manion et al. | |
| 7,159,223 B1 | 1/2007 | Comeau et al. | |
| 7,181,620 B1 * | 2/2007 | Hur | 713/171 |
| 7,185,194 B2 | 2/2007 | Morikawa et al. | |
| 7,213,060 B2 | 5/2007 | Kemp et al. | |
| 7,299,351 B2 | 11/2007 | Huitema et al. | |
| 2001/0003191 A1 | 6/2001 | Kovacs et al. | |
| 2001/0035976 A1 | 11/2001 | Poon | |
| 2001/0053213 A1 | 12/2001 | Truong et al. | |
| 2002/0073204 A1 | 6/2002 | Dutta et al. | |
| 2002/0078243 A1 | 6/2002 | Rich et al. | |
| 2002/0097267 A1 | 7/2002 | Dinan et al. | |
| 2002/0140730 A1 | 10/2002 | Linsey et al. | |
| 2002/0143989 A1 | 10/2002 | Huitema et al. | |
| 2002/0144149 A1 | 10/2002 | Hanna et al. | |
| 2002/0154172 A1 | 10/2002 | Linsey et al. | |
| 2002/0184358 A1 | 12/2002 | Traversat et al. | |
| 2002/0188657 A1 * | 12/2002 | Traversat et al. | 709/201 |
| 2002/0188881 A1 | 12/2002 | Liu et al. | |
| 2002/0194484 A1 | 12/2002 | Bolosky et al. | |
| 2003/0014485 A1 | 1/2003 | Banatwala | |
| 2003/0036941 A1 | 2/2003 | Leska et al. | |
| 2003/0055892 A1 | 3/2003 | Huitema et al. | |
| 2003/0056093 A1 | 3/2003 | Huitema et al. | |
| 2003/0056094 A1 | 3/2003 | Huitema et al. | |
| 2003/0088544 A1 | 5/2003 | Kan et al. | |
| 2003/0126027 A1 | 7/2003 | Nelson et al. | |
| 2003/0135629 A1 | 7/2003 | Sasaki et al. | |
| 2003/0140119 A1 | 7/2003 | Acharya et al. | |
| 2003/0147386 A1 | 8/2003 | Zhang et al. | |
| 2003/0196060 A1 | 10/2003 | Miller | |
| 2003/0217073 A1 | 11/2003 | Walther et al. | |
| 2004/0064693 A1 * | 4/2004 | Pabla et al. | 713/168 |
| 2004/0078436 A1 | 4/2004 | Demsky et al. | |
| 2004/0082351 A1 | 4/2004 | Westman | |
| 2004/0088325 A1 | 5/2004 | Elder et al. | |
| 2004/0111423 A1 | 6/2004 | Irving et al. | |
| 2004/0111469 A1 | 6/2004 | Manion et al. | |
| 2004/0111515 A1 | 6/2004 | Manion et al. | |
| 2004/0111525 A1 | 6/2004 | Berkland et al. | |
| 2004/0117446 A1 | 6/2004 | Swanson | |
| 2004/0120344 A1 | 6/2004 | Sato et al. | |
| 2004/0122898 A1 | 6/2004 | Srinivasa | |
| 2004/0122901 A1 | 6/2004 | Sylvain | |
| 2004/0128350 A1 | 7/2004 | Topfl et al. | |
| 2004/0133640 A1 * | 7/2004 | Yeager et al. | 709/204 |
| 2004/0141005 A1 | 7/2004 | Banatwala et al. | |
| 2004/0143603 A1 | 7/2004 | Kaufmann et al. | |
| 2004/0148333 A1 | 7/2004 | Manion et al. | |
| 2004/0148611 A1 | 7/2004 | Manion et al. | |
| 2004/0172455 A1 | 9/2004 | Green et al. | |
| 2004/0172456 A1 | 9/2004 | Green et al. | |
| 2004/0184445 A1 | 9/2004 | Burne | |
| 2004/0205243 A1 * | 10/2004 | Hurvig et al. | 709/245 |
| 2004/0242329 A1 | 12/2004 | Blackburn et al. | |
| 2004/0249970 A1 | 12/2004 | Castro et al. | |
| 2004/0260771 A1 | 12/2004 | Gusler et al. | |
| 2005/0004984 A1 | 1/2005 | Simpson | |
| 2005/0009537 A1 | 1/2005 | Crocker et al. | |
| 2005/0027805 A1 | 2/2005 | Aoki | |
| 2005/0038856 A1 | 2/2005 | Krishnasamy et al. | |
| 2005/0066001 A1 | 3/2005 | Benco et al. | |
| 2005/0080768 A1 | 4/2005 | Zhang et al. | |
| 2005/0080859 A1 | 4/2005 | Lake | |
| 2005/0086300 A1 * | 4/2005 | Yeager et al. | 709/204 |
| 2005/0102245 A1 | 5/2005 | Edlund et al. | |
| 2005/0102356 A1 | 5/2005 | Manion et al. | |
| 2005/0114487 A1 | 5/2005 | Peng et al. | |
| 2005/0125529 A1 | 6/2005 | Brockway et al. | |
| 2005/0125560 A1 | 6/2005 | Brockway et al. | |
| 2005/0171799 A1 | 8/2005 | Hull et al. | |
| 2005/0198173 A1 | 9/2005 | Evans | |
| 2005/0235038 A1 | 10/2005 | Donatella et al. | |
| 2006/0239206 A1 * | 10/2006 | Rao et al. | 370/254 |
| 2008/0031460 A1 * | 2/2008 | Brookner et al. | 380/282 |

FOREIGN PATENT DOCUMENTS

| | | |
|---|---|---|
| GB | 2378268 | 2/2003 |

| | | |
|---|---|---|
| JP | 2002197246 | 11/2001 |
| JP | 20022335269 | 11/2002 |
| WO | WO-0120450 | 3/2001 |
| WO | WO-2005/046164 A1 | 5/2005 |

OTHER PUBLICATIONS

Philip J. Erdelsky, *The Birthday Paradox*, EFG, at http://www.efgh.com/math/birthday.htm (last visited Mar. 8, 2002).

*Red-Black Tree*, National Institute of Standards and Technology, at http://www.nist.gov/dads/HTML/redblack.html (last visited Mar. 5, 2002).

Lai, Kevin; and Mary Baker, *Measuring Link Bandwidths Using a Deterministic Model of Packet Delay*, at Department of Computer Science at Stanford University, 13 pages.

Rowstron, Antony, and Peter Druschel, *Pastry: Scalable, distributed object location and routing for large-scale peer-to-peer systems*, at Microsoft Research, Ltd., St. George House and Rice University, 20 pages.

Druschel, Peter, and Antony Rowstron, *PAST: A large-scale, persistent peer-to-peer storage utility*, at Rice University and Microsoft Research, 6 pages.

Rowstron, Antony, and Peter Druschel, *Storage management and caching in PAST, a large-scale, persistent peer-to-peer storage utility*, at Microsoft Research, Ltd., St George House and Rice University, 14 pages.

Rowstron, Antony, Anne-Marie Kermarrec, Peter Druschel, and Miguel Castro, *SCRIBE: The design of a large-scale event notification infrastructure*, at Microsoft Research, Ltd., St. George House and Rice University, 20 pages.

Dabek, Frank, Emma Brunskill, M.Frans Kaashoek, David Karger, Robert Morris, Ion Stoica, and Hari Balakrishnan, *Building Peer-to-Peer Systems With Chord, a Distributed Lookup Service*, at MIT Laboratory for Computer Science, 6 pages, at http://pdos.lcs.mit.edu/chord.

Ellison, C., *SPKI Requirements*, (The Internet Society 1999), at http://www.ietf.org/rfc/rfc2692.txt?number=2692 (last visited Aug. 6, 2001).

Ellison, Carl, Bill Frantz, Butler Lampson, Ron Rivest, Brian M. Thomas, and Tatu Ylonen, *Simple Public Key Certificate*, (Internet Draft 1999), at http://www.world.std.com/~cme/spki.txt (last visited Aug. 6, 2001).

Ellison, C., B. Frantz, B. Lampson, R. Rivest, B. Thomas, and T. Ylonen, *SPKI Certificate Theory*, (The Internet Society 1999), at http://www.ietf.org/rfc/rfc2693.txt?number=2693 (last visited Aug. 6, 2001).

"At What Cost Pervasive? a Social Computing View of Mobile Computing Systems," IBM Research: vol. 38, No. 4, 1999, Pervasive Computing (28 pgs.).

"*Connecting and Extending Peer-to-Peer Networks*," Lion Share White Paper, dated Oct. 2004, 32 pages, http://lionshare.its.psu.edu/main/info/docspresentation/LionshareWP.pdf.

"Design Explorations," IBM Research: Social Computing Group (4 pgs.).

"IBM Lotus Instant Messaging and Web Conferencing," IBM Software - IBM Lotus Instant Messaging and Web Conferencing home page (3 pgs.).

"IBM Workplace Collaboration Services Overview Guide" dated Jan. 2005, 2 pages. (Printed from ftp://ftp.lotus.com/pub/lotusweb/IGM_Workplace_collaboration_services_g224733301_118.pdf on Jul. 1, 2005).

"*Meteor-S Web Service Discovery Infrastructure*," A Component of the Meteor-S System on Semantic Web Services and Processes; Meteor-S Web Service Discovery Infrastructure (MWSDI); dated Dec. 14, 2005, 2 pages; http://lsdis.cs.uga.edu/proj/meteor/mwsdi.html.

"Microsoft Computer Dictionary," Fifth Edition, Microsoft Press, 2002pp pp. 31, 238-239, 424, 467.

"Microsoft, Groove Networks to Combine Forces to Create Anytime, Anywhere Collaboration," Microsoft Presspass-lnformation for Journalists, retrieved from http://www.microsoft.com/prespass/features/2005/mar05/03-10GrooveQA.asp on May 31, 2005 (5 pages).

"*Microsoft Overhauls Longhorn Drivers for Usability, Connectivity*," eWeek.com Enterprise News & Reviews, dated Dec. 14, 2005, 5 pages; http://vwww.eweek.com/article2/0,1759,1654462,00.asp.

"News: Sun Incorporating JXTA into Products," java.net The Source for Java Technology Collaboration, Jan. 30, 2004, retrieved from http://today.java.net.pub/n/SunKXTA on Jun. 2, 2005 (1 page).

"Presence and Awareness Services," Ramiro Liscano, Professor, Site, University of Ottawa, 89 pages, http://www.site.uottawa.ca/-rliscano/tutorials/PresenceAwarenessServices.pdf.

"Products: Groove Virtual Office FAX," Groove Networks, retrieved from http://wwwgroove.net/index.cfm?pagename=VO_FAX on May 31, 2005 (7 pages).

"Products: Groove Virtual Office," Groove Networks, retrieved from http://www.groove.net/index.cfm/pagename/VirtualOFfice on May 31, 2005 (2 pages).

"Products: Why Groove," Groove Networks, retrieved from http://www.grove. net/index.cfm?pagename=Products_Overview on May 31, 2005 (3 pages).

"Project JXTA: An Open, Innovative Collaboration," Sun Microsystems, Inc. Apr. 25, 2001, (pp. 1-5).

"Project JXTA: Technical Shell Overview," Sun Microsystems, Inc. Apr. 25, 2001; retrieved from http://www.jxta.org/project/www.docs/TechShellOverview.pdf on Aug. 10, 2006.

"Project JXTA: Technical Specification," Version 1.0, Sun Microsystems, Inc., Apr. 25, 2001; retrieved from http://download.jxta.org/files/documents/27/12/JXTA-Spec.pdf on Aug. 10, 2006.

"Publication Related to Pastry," http://research.microsoft.com/-~antr/Pastry/pubs.htm.

Reynolds, J .,"BOOTP Vendor Information Extensions," Network Working Group, http://www.faqs.org/rfc/rfc1395.txt, retrieved Dec. 23, 2005, Jan. 1993.

The Gnutella Protocol Specification v0.4, http://www.clip2.com.

About Presentation Broadcasting, 3 pages printed Jul. 1, 2005 from http://office.microsoft.com/en-us/assistance/HP052411931033.aspx.

Adamic, L., "P2P Search that Scales," pre-presentation description for talk on Nov. 7, 2001, http://conferences.oreillynet.com/cs/p2web2001/view.

Balachander et al., "Early Measurements of a Cluster-Based Architecture for P2P Systems", IMW '01, ACM, pp. 105-109 (2001).

Beatty et al., "*Web Services Dynamic Discovery (WS-Discovery)*," Microsoft Corporation, dated Apr. 2005, 42 pages; http://msdn.microsoft.com/library/en-us/dnglobspec/html/WS-Discovery.pdf.

Bolcer et at., "Peer-to-Peer Architectures and the Magi™ Open-Source Infrastructure,"Endeavors Technology, Inc., Dec. 6, 2000.

Bouvin, "Designing User Interfaces for Collaborative Web-Based Open Hypermedia," in Proceedings of the Eleventh ACM Conference on Hypertext and Hypermedia, pp. 230-231 (San Antonio, TX, 2000).

Boyer et al., "Virtual Social Clubs: Meeting Places for the Internet Community," IEEE International Conference on Multimedia Computing and Systems, pp. 297-301 (Florence, Italy, Jun. 7-11, 1999).

Castro et al., "*Secure Routing For Structured Peer-to-Peer Overlay Networks*," Usenix, OSDI '02 Paper (OSDI '02 Tech Program Index) pp. 299-314 of the Proceedings, Fifth Symposium on Operating Systems Design and Implementation (OSDI 2002) 33 pages, http://www.usenix.org/events/osdi02/tech/full_papers/castro/castro_html/.

Castro et al., "*Topology-Aware Routing In Structured Peer-to-Peer Overlay Networks*," Technical Report MSR-TR-2002-82, Microsoft Research, Microsoft Corporation, http://www.research.microsoft.com.

Cheng et al." Hutchworld: Lessons Learned. A Collaborative Project: Fred Hutchinson Cancer Research Center & Microsoft Research," in Proceedings of Second International Conference onVirtual Worlds (VW 2000), pp. 1-2 (Paris, France, Jul. 5-7, 2000). http://research.microsoft.com/scg/papers/hutchvw2000.pdf.

Cheung, "*Chatopus for Palm OS, Using IM Bots for Jabber,* " Chatopus-Palm OS Instant Messaging Client for XMPP/Jabber, Dated Oct. 20, 2002 (Last updated: Jun. 25, 2005), 6 pages, http://www.chatopus.com/articles/bots.html.

Clark et al., "Freenet: A Distributed Anonymous Information Storage and Retrieval System", H. Federrath (Ed.), Anonymity 2000, LNCS 2009, pp. 46-66 2001.

Cugola et al., "Peer to Peer for Collaborative Applications," in Proceedings of the 22nd International Conference on Distributed Computing Systems Workshops (ICDCS'02), pp. 359-364 (Vienna, Austria, Jul. 2-5, 2002).

Dorohonceanu et al., "A Desktop Design for Synchronous Collaboration," in Proceedings of the Graphics Interface '99 (GI'99), pp. 27-35 (Kingston, Ontario, Canada, Jun. 1999).

Duhr, "Oberflachenelemente in interaktiven und kooperativen anwendungen," Universitat Oldenburg, Department of Information Systems Thesis (Aug. 2000).

European Search Report; EP 02 00 5770; Munich; Aug. 9, 2005; Examiner: E. Bertolossi.

Farnham et al., "Supporting Sociability in a Shared Browser," in Proceedings of Interact Conference (Tokyo, Japan, Jul. 2001) http://research.microsoft.com/scg/papers/sharedbrowsinginteract.pdf, pp. 1-8.

Gagnes et al., "*Discovering Semantic Web Services in Dynamic Environments*," Norwegian Defence Research Establishment (FFI), University of Oslo, Department of Informatics, Oslo, Norway, 4 pages; http://wscc.info/p5156//files/paper61.pdf.

Garcia et al., "Extending a Collaborative Architecture to Support Emotional Awareness," EBAA '99 - Workshop on Emotion-Based Agent Architectures, pp. 46-52 (May 2, 1999).

Gong, Li. "Project JXTA: A Technology Overview," Sun Microsystems, Inc., Apr. 25, 2001; retrieved from http://download.jxta.org/files/documents/27/35/JXTA-Tech-Overview.pdf on Aug. 10, 2006.

Greenberg et al, "Using a Room Metaphor to Ease Transitions in Groupware," University of Calgary, Department of Computer Science, Research Report 98/611/02, 31 pages (1998).

Greenberg, "Collaborative Interfaces for the Web," in Human Factors and Web Development, (Forsythe et al., eds.) Chapter 18, pp. 241-253, Lea Press, (1997).

Gutwin, "Workspace Awareness in Real-Time Distributed Groupware," the University of Calgary, Department of Computer Science, Ph.D. Thesis, 250 pages (Dec. 1997).

Handley et al., "SIP: Session Initiation Protocol," Network Working Group, Request for Comments 2543, pp. 1-153 (Mar. 1999).

Hong et al., "Dynamic Group Support in LANMAR Routing Ad Hoc Networks," IEEE, pp. 304-308 (2002).

Hoschek, Wolfgang, "A Unified Peer-to-Peer Database Framework for Scalable Service and Resource Discovery", M. Parasher (Ed.), GRIG 2002, LNCS 2536, pp. 126-144 (2002).

Huitema, C., Distributed Peer-to-Peer Name Resolution, Presentation Slides from the O'Reilly Peer-to-Peer and Web Services Conference, Nov. 5, 2001.

Joa-Ng, M. et al., "A GPS-based Peer-to-Peer Hierarchical Link State Routing for Mobile Ad Hoc Networks", IEEE 51$^{st}$ Vehicular Technology Conference Proceedings, vol. 3, pp. 1752-1756 (2000).

Joa-Ng, M. et al., "A Peer-to-Peer Zone-Based Two-Level Link State Routing for Mobile Ad Hoc Networks", IEEE Journal on Selected Areas in Communications, vol. 17, No. 8, pp. 1415-1425 (Aug. 1999).

Kollock et al., "Managing the Virtual Commons: Cooperation and Conflict in Computer Communities," in Computer-Mediated Communication: Linguistic, Social, and Cross-Cultural Perspectives, (Herring, ed.), pp. 109-128 (John Benjamins, Amsterdam, Netherlands, 1996) http://research.microsoft.com/scg/papers/KollockCommons.htm.

Kollock, "The Economies of Onlline Cooperation: Gifts and Public Goods in Cyberspace," in Communities in Cyberspace, (Smith et al, eds.), pp. 1-17 (Routledge, London, UK, 1999) http://www.sscnet.ucla.edu/soc/faculty/kollock/papers/economies.htm.

Kwon et al., "An Efficient Peer-to-Peer File Sharing Exploiting Hierarchy and Asymmetry", IEEE, pp. 226-233 (2003).

Labovitz et al., "Internet Routing Instability", SIGCOMM '97, ACM, pp. 115-126 (1997).

Lee et al., "Supporting Multi-User, Multi-Applet Workspaces in CBE," in Proceedings of the ACM 1996 Conference on Computer Supported Cooperative Work, pp. 344-353 (Cambridge, MA, 1996.

Legedza et al., "Using Network-level Support to Improve Cache Routing", Hamilton et al., (Ed.), Computer Networks and ISDN Systems: The International Journal of Computer and Telecommunications Networking, vol. 30, No. 22-23, pp. 2193-2201 (1998).

MeetingMaker - Meeting Maker printout, 2 pages printed on Jul. 1, 2005 from http://www.rneetingmaker.com/products/meetingmaker/default.cfm.

MeetingMaker - WebEvent Publish printout, 2 pages printed on Jul. 1, 2005 from http://www.meetingmaker.com/products/webevent_publish/default.cfm.

Microsoft Corporation; "Introduction to Windows Peer-to-Peer Networking," Published: Jan. 2003.

Microsoft.com, "Peer-to-Per Common Documentation," http://msdn.microsoft.com/library/default.asp?url=/library/en-us/p2psdk/p2p/peer_to_common_documentation.asp, (last visited Aug. 5, 2005).

Morris, J.; Data Structures and Algorithms—Sections 8.3; Online Publication 1998; http://clips.ee.uwa.edu.au/{morris/Year2/PLDS210/hash_tables.html.>: Aug. 8, 2005.

Newmarch, J., "JXTA Overview," Oct. 7, 2002, retrieved from http://jan.netcomp.monash.edu.au/distjava/jxta.html on Jun. 2, 2005 (pp. 1-15).

Oram, A.,; Peer -to-Peer: Harnessing the Benefits of a Distruptive Technology Passage; Peer-to-Peer: Harnessing the Benefits of a Disruptive Technology; Mar. 15, 2001; pp. 94-122.

Partial European Search Report; E0 02 00 5770; Mar. 27, 2005; Examiner: E. Bertolissi.

Portmann et al., "The Cost of Peer Discovery and Searching in the Gnutella Peer-to-peer File Sharing Protocol", Proceedings Ninth IEEE International Conference on Networks, pp. 263-268 (2001).

Portmann, M., et al., "The Cost of Application-level Broadcast in a Fully Decentralized Peer-to-peer Network", Proceedings ISCC 2002 Seventh International Symposium, pp. 941-946 (2002).

QuickTime Broadcaster (3 pages) printed Jul. 1, 2005 from http://www.apple.com/guicktime/broadcaster/.

Ratnasamy et al., "A Scalable Content-Addressable Network", SIGCOMM '01, ACM, pp. 161-172 (2001).

Saroiu et al., "A Measurement Study of Peer-to-Peer File Sharing Systems", Technical Report #UW-CSE-01-06-02, Department of Computer Science & Engineering, University of Washington, Seattle, Washington, 14 pages (2001).

Schmidt et al., "A Generic System for Web-Based Group Interaction," in Proceedings of the Thirty-First Hawaii International Conference on System Sciences, vol. I, pp. 545-554 (Kohala Coast, HI, Jan. 6-9, 1998).

Sedgewick R.; Algorithms in C—Third Edition—Part of Chapter XVI; Algorithms in C—Third Edition, 1998; pp. 662-691.

Sedgewick, R.; Algorithms in C—Thrid Edition—Chapter XIV; Algorithms in C++; 1998; pp. 573-608; Section 14.4.

SlidesNow! (3 pages) printed Jul. 1, 2005 from http://www.slidesnow.com/about.shtml.

Smith et al., "The Social Life of Small Graphical Chat Spaces, in Proceedings" in Proceedings of the SIGCHI Conference on Human Factors in Computing Systems, pp. 462-469 (The Hague, Netherlands, Mar. 2000) http://research.microsoft.com/scg/papers/vchatchi2000.pdf.

Smith et al., "What Do People Do in Virtual Worlds? An Analysis of V-Chat Log File Data," Microsoft Corporation Report (Apr. 1, 1998) http://research.microsoft.com/scq/papers/kollockvpchat.pdf.

Stoica et al., A Scalable Peer-to-Peer Lookup Service for Internet Applications; MIT Technical Report; Mar. 23, 2001; http://www.lcs.mit.edu/publications/pubs/ps/MIT-LCS-TR-819.ps>.

Sunaga et al., "Advanced Peer-to-Peer Network Platform for Various Services-SIONet (Semantic Information Oriented Network)", Proceedings of the Second Internationa Conference on Peer-to-Peer Computing, IEEE, pp. 169-170 (2002).

Tanenbaum, Andrew S., "Computer Networks," Third Edition, Prentice Hall PTR, 1996; pp. 437-449.

The Best Way to Centrally Deploy Applications and Provide On-Demand Access, 2 pages printed Jul. 1, 2005 from http://www.citrix.com/English/ps2/products/product.asp?contentID=186.

Traversat et al., "Project JXTA Virtual Network," Sun Microsystems, Inc. Oct. 28, 2002 (pp. 1-10).

Tyson, "How the Old Napster Worked," http://computer.howstuffworks.com/napster.htm/printable.

Xiao et al., "On Reliable and Scalable Peer-to-Peer Web Document Sharing", Proceedings of the International Parallel and Distributed Processing Symposium, IEEE, pp. 23-30 (2002).

Zhang et al., "gMeasure: A Group-based Network Performance Measurement Service for Peer-to-Peer Applications", IEEE Globecom 2002, 5 pgs (2002).

Zhao, et al., "A Web Based Multi-Display Presentation System," 2 pages printed Jul. 1, 2005 from http://www.fxpal.com/publications/FXPAL-PR-04-303.pdf.

Zhao et al., "Tapestry: An Infrastructure for Fault-tolerant Wide-area Location and Routing", Report No. UCB/CSD-01-1141, Computer Science Division (EECS), University of California, Berkeley, California, 27 pqs (2001).

* cited by examiner

PEER-TO-PEER IDENTITY MANAGEMENT INTERFACES AND METHODS

FIELD OF THE INVENTION

The present invention relates generally to identity management in a peer-to-peer infrastructure, and more particularly to application programming interfaces and methods for the creation, management, porting, and deletion of peer-to-peer identities.

BACKGROUND OF THE INVENTION

Peer-to-peer communication, and in fact all types of communication, depend on the possibility of establishing valid connections between selected entities. These entities may be peers (e.g., users or machines) or groups formed within a peer-to-peer network. However, entities may have one or several addresses that may vary because the entities move in the network, because the topology changes, because an address lease cannot be renewed, because the group function or purpose has changed, etc. A classic architectural solution to this addressing problem is thus to assign to each entity a stable name, and to "resolve" this name to a current address when a connection is needed. This name to address translation must be very robust, and it must also allow for easy and fast updates.

To increase the likelihood that an entity's address may be found by those seeking to connect to it, many peer-to-peer protocols allow entities to publish their individual or group address(es) through various mechanisms. Some protocols also allow a client to acquire knowledge of other entities' addresses through the processing of requests from others in the network. Indeed, it is this acquisition of address knowledge that enables successful operation of these peer-to-peer networks. That is, the better the information about other peers and groups in the network, the greater the likelihood that a search for a particular resource will converge.

However, without a simple and robust mechanism that allows a user to easily establish and manage this single or these various identities that are to be used in the P2P network, users will be unable to take advantage of the benefits of the such networks. That is, the creation of P2P identities requires that numerous individual pieces of information be created and associated together in a consistent and logical fashion. This creation and association includes the creation of a friendly name, the selection and generation of a public/private key pair, the creation of an identity certificate (IDC) in coordination with the key pair, the association the IDC into the P2P infrastructure, the association of that with the name resolution protocol identities, etc. Each of these tasks alone are complex, and it is unlikely that the casual user would be able to properly create and/or associate this information in a manner that would ensure fruitful participation in the P2P network.

Even if a user were able to properly create and associate the required information to form a P2P identity that would allow for successful resolution and participation in the P2P network, such participation would be constrained to a single physical location. While this may not seem to be a problem, the nature of mobile computing today, and of the mobility of users, renders such constraints undesirable. This problem is particularly troublesome as a user desires to maintain his or her on-line persona regardless of where the user is physically located or onto which computing device the user is logged.

Within the public P2P cloud there may also exist private groups of peers who have associated with one another for a given purpose. Membership in such groups is typically governed by some form of group certificate that is associated with a particular P2P identity. Communications within the group is typically limited to user identities who can present the proper credentials. Therefore, it is important for a user identity to be able to properly associate with the group certificate. However, since there is no limitation on how many groups a particular P2P identity may belong, it become critical to manage not only the various identities that a user may use in the P2P cloud, but also the group membership certificates associated with each of the appropriate identities. Currently, however, no such identity management exists.

There exists, therefore, a need in the art for a peer-to-peer identity management interface that addresses the above-described and other problems existing in the art.

BRIEF SUMMARY OF THE INVENTION

The inventive concepts disclosed in this application involve a new and improved system and method for identity management in a peer-to-peer (P2P) network. More specifically, the present invention is directed to a new and improved P2P application programming interface (API) and method that allows a user to create, import, export, manage, enumerate, and delete P2P identities that may be resolved in a P2P network. Further, the present invention is directed to a new and improved P2P application programming interface (API) and method that allows management of group and identity information.

In one embodiment of the present invention, an API and method are presented that abstracts away from the low level credential and cryptographic functions that are required to be performed to create and manage a P2P identity. Preferably, a group of related APIs are provided to create, delete, manage, enumerate, import, and export P2P identities. The management of the P2P identities preferably includes the retrieval and setting of a chosen friendly name, the generation of a cryptographic public/private key pair, the retrieval of security information in the form of an XML fragment, and the creation of a new name based on an existing identity. Since the P2P environment also allows for the existence of multiple separate groups of peers within the P2P cloud, a preferred embodiment of the present invention also allows for the enumeration of all groups associated with a given identity, for each identity existing for the user.

In one embodiment of the present invention, application programming interfaces are provided that create peer identities, that retrieve friendly names of identities, that set friendly names of identities, that get cryptographic key information for an identity, that delete peer identities, that export peer identity information, that import peer identity information, that enumerates peer identities, that enumerates groups associated with peer identities, that retrieves XML fragments containing security information for an identity, and that creates peer names based on existing names of identities. Each of these interfaces utilize various parameters that are passed in from an application program that uses these interfaces to manage a peer identity. The interfaces return a value that indicates the success or failure of the function. For failures, the interfaces provide an indication as to the problem resulting in the failure.

BRIEF DESCRIPTION OF THE DRAWINGS

The accompanying drawings incorporated in and forming a part of the specification illustrate several aspects of the present invention, and together with the description serve to explain the principles of the invention. In the drawings.

Figure 1:
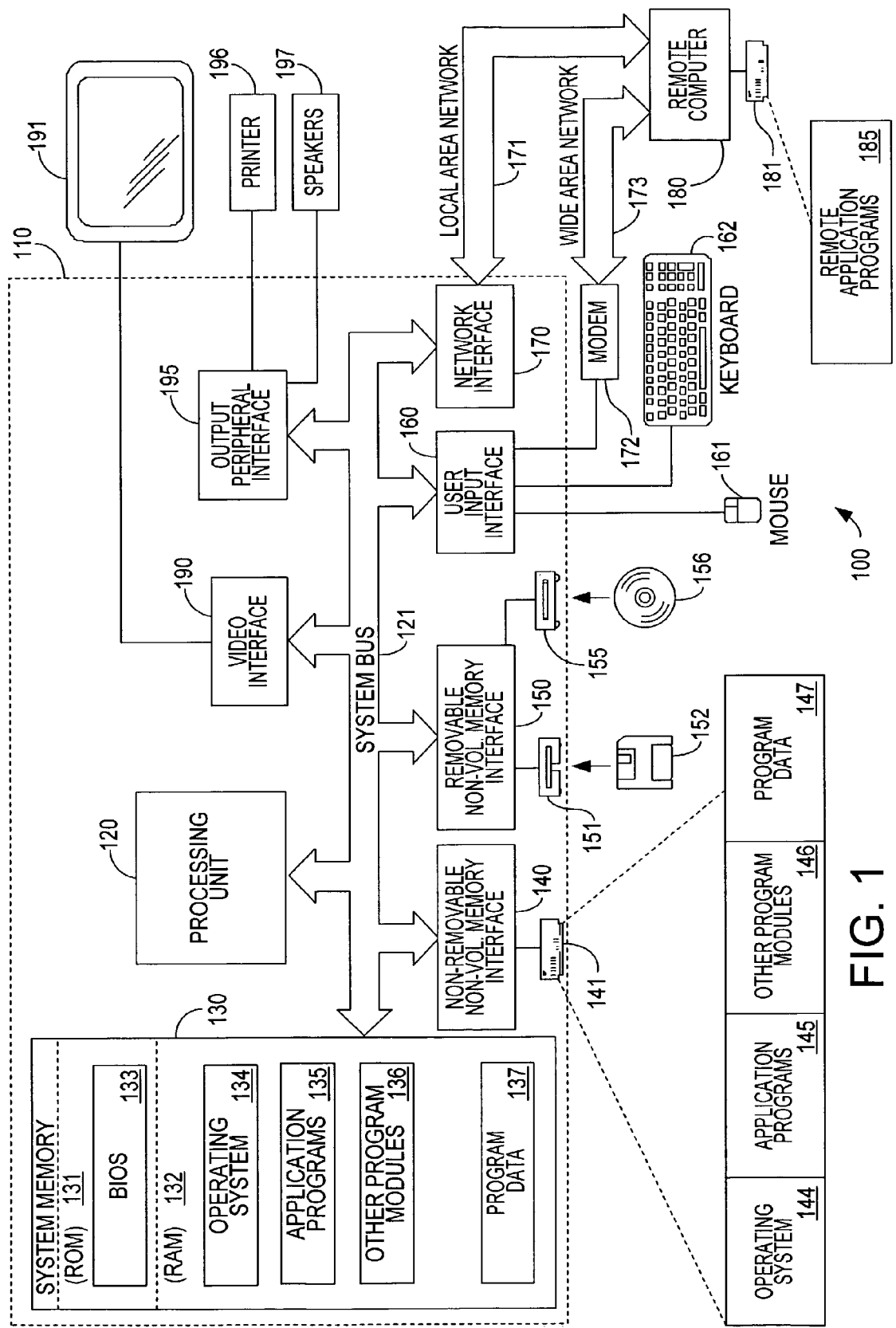
FIG. 1 is a block diagram generally illustrating an exemplary computer system on which the present invention resides.

While the invention will be described in connection with certain preferred embodiments, there is no intent to limit it to those embodiments. On the contrary, the intent is to cover all alternatives, modifications and equivalents as included within the spirit and scope of the invention as defined by the appended claims.

DETAILED DESCRIPTION OF THE INVENTION

Turning to the drawings, wherein like reference numerals refer to like elements, the invention is illustrated as being implemented in a suitable computing environment. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multi-processor systems, microprocessor based or programmable consumer electronics, network PCs, minicomputers, mainframe computers, and the like. The invention may also be practiced in distributed computing environments where tasks are performed by remote processing devices that are linked through a communications network. In a distributed computing environment, program modules may be located in both local and remote memory storage devices.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, etc. that perform particular tasks or implement particular abstract data types. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system for implementing the invention includes a general purpose computing device in the form of a computer 110. Components of computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Associate (VESA) local bus, and Peripheral Component Interconnect (PCI) bus also known as Mezzanine bus.

Computer 110 typically includes a variety of computer readable media. Computer readable media can be any available media that can be accessed by computer 110 and includes both volatile and nonvolatile media, removable and non-removable media. By way of example, and not limitation, computer readable media may comprise computer storage media and communication media. Computer storage media includes both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 110. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers hereto illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through a output peripheral interface 195.

The computer 110 may operate in a networked environment using logical connections to one or more remote computers, such as a remote computer 180. The remote computer 180 may be another personal computer, a server, a router, a network PC, a peer device or other common network node, and typically includes many or all of the elements described above relative to the personal computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the personal computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the personal computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

In the description that follows, the invention will be described with reference to acts and symbolic representations of operations that are performed by one or more computer, unless indicated otherwise. As such, it will be understood that such acts and operations, which are at times referred to as being computer-executed, include the manipulation by the processing unit of the computer of electrical signals representing data in a structured form. This manipulation transforms the data or maintains it at locations in the memory system of the computer, which reconfigures or otherwise alters the operation of the computer in a manner well understood by those skilled in the art. The data structures where data is maintained are physical locations of the memory that have particular properties defined by the format of the data. However, while the invention is being described in the foregoing context, it is not meant to be limiting as those of skill in the art will appreciate that various of the acts and operation described hereinafter may also be implemented in hardware.

As introduced above, the success of a peer-to-peer (P2P) protocol depends on the protocol's ability to establish valid connections between selected entities. Likewise, the formation of groups in such a P2P network relies on this ability. Because a particular user may connect to the network in various ways at various locations having different addresses, a preferred approach is to assign a unique identity to the user or the group, and then resolve that identity to a particular address or addresses through the protocol. Such a peer-to-peer name resolution protocol (PNRP) to which the identity management system and method of the instant invention finds particular applicability, although by which the present invention is not limited, is described in co-pending application Ser. No. 09/942,164, entitled Peer-To-Peer Name Resolution Protocol (PNRP) And Multilevel Cache For Use Therewith, filed on Aug. 29, 2001, in co-pending application Ser. No. 10/122,863, entitled Multi-Level Cache Architecture and Cache Management Method for Peer-To-Peer Name Resolution Protocol, filed Apr. 15, 2002, and in co-pending application Ser. No. 09/955,923, entitled Peer-To-Peer Group Management and Method For Maintaining Peer-To-Peer Graphs, filed on Sep. 19, 2001, the teachings and disclosure of which are hereby incorporated in their entireties by reference thereto.

However, one skilled in the art will recognize from the following teachings that the P2P identity management interfaces and methods of the present invention are not limited to the particular peer-to-peer protocol of these co-pending applications, but may be applied to other resolution protocols with equal force. Likewise, co-pending application Ser. No. 09/956,260, entitled Peer-To-Peer Name Resolution Protocol (PNRP) Security Infrastructure And Method, filed on Sep. 19, 2001 describes an underlying security infrastructure that ensures that the identities of the various entities within the network are valid, without unnecessary burdening the network with excess traffic. In the P2P grouping environment, co-pending application Ser. No. 09/955,924, entitled Peer-To-Peer Name Resolution Protocol (PNRP) Group Security Infrastructure and Method, filed on Sep. 19, 2001, describes the underlying security infrastructure used for such groups. The teachings and disclosure of these applications are also incorporated in their entireties by reference thereto. However, while the interfaces and methods of the present invention find particular applicability to and interaction with such PNRP, one skilled in the art will recognize that the present invention is not limited thereby, but has applicability to any P2P system or protocol that desires to provide identity management functions.

As discussed in the above-incorporated co-pending application describing the PNRP and to provide some useful background, establishing peering relations between individual peers is an expensive process in existing peer-to-peer networks. In the PNRP, however, each node accumulates a routing table that contains a list of references to other nodes in the network. For each node entry, address information, which may include a node identification, address, the key of the node, and the distance between the key of this node and the key of the local node are obtained. Each time the local node learns about a remote node, it checks whether the node is already known, and if not whether to enter an entry in the routing table. Each entry has an 'ideal cache level' determined by its 'distance' from the cache owner. New entries may only be added to the cache level corresponding to their distance, or to the lowest level if the entry's 'ideal cache level' has not been breached yet.

For communication between individual peers in PNRP, when a node receives a query it searches for the entry in its routing table whose key best matches the target, excluding the nodes that have already been visited. The query is then forwarded directly to the node that advertised the entry. If there is no adequate entry, the request is sent back to the node from which the request was received; this node will try another entry in its own routing table. The request is successful if it reaches the entry whose key matches the target. It is unsuccessful if the target is not reached in the maximum number of steps, or if the node from which the request was received tries all possible neighbors and receives a negative response. In the case of successful requests, the response is relayed by all intermediate hops. It carries the address of the node that held the target key, and this entry can be inserted in the routing tables of the intermediate nodes.

To allow this protocol to operate properly with valid information, the underlying security infrastructure described in the above-identified application utilizes an underlying trust model. In this model, it is assumed that private-public key encoding is trusted. That is, it is trusted that for one public key there is one and only one private key that can be used to perform the reverse cryptographic operation. Also, private-public key unique generation is trusted. That is, the algorithm for generating private-public keys is trusted to produce unique key pairings every time it is run.

It is instructive to note that, in view of this trust model, the PNRP security infrastructure computes the entity's identity (ID) as a 128-bit hash of the public key of a self-generated RSA key pair. The public key used to generate the ID can also be the public key of one of the X.509 certificates that an entity owns. Other methods of unique ID generation may be used as appropriate, provided that they are able to scale to the desired network size while still ensuring global uniqueness of the ID. In one embodiment of the PNRP security infrastructure, the uniqueness of the identity is ensured by the algorithm that generates the asymmetric key pairs. As indicated above, an entity may also be a group. Therefore, the group identity may also be formulated in this way.

As with many successful P2P protocols, entities (both individual peers as well as groups) can be published for easy discovery. To provide security and integrity to the P2P protocol, however, each identity preferably includes an attached identity certificate. The keeper of the ID's private key uses the certificate to attach additional information to the ID, such as the friendly name, etc. Preferably, each node generates its own pair of private-public keys, although such may be provided by a trusted supplier. The public key is then included as part of the node identifier. Likewise, a group creator generates group public and private keys. Only the node that created the pair of keys has the private key with which it can prove that it is the creator of the identity. In this way, identity theft may be discovered, and is, therefore, deterred.

As also discussed in this above-identified application, peer identification certificates provide integrity and validity to a peer's identity in the P2P network. These ID certificates are of the form [Version, ID, <ID Related Info>, Validity, Algorithms, $P_{Issuer}$]$K_{Issuer}$. As used in this certificate representation, Version is the certificate version, ID is the peer name to be published, <ID Related Info> represents information to be associated with the ID, Validity represents the period of validity expressed in a pair of From-To dates expressed as Universal Date Time (aka GMT), Algorithms refers to the algorithms used for generating the key pairs, and for signing, and $P_{Issuer}$ is the public key of the certificate issuer. If the certificate issuer is the same as the ID owner then this can be left blank. In such a case it is assumed that $P_{Issuer}=P_{ID}$. The term $K_{Issuer}$ is the private key pair of $P_{Issuer}$. If the certificate issuer is the ID owner then this is $K_{ID}$, the private key of the ID owner.

In the P2P group context, a group membership certificate of similar structure wherein the <ID Related Info> comprises the Peer name that is certified as the member of the group, and a certificate Serial Number. Such a group membership certificate is of the structure [Version, ID, Peer ID, Serial Number, Validity, Algorithms, $P_{ID}$, $P_{Issuer}$]$K_{Issuer}$. As used therein, ID is the Group ID, Peer ID is the Peer name that is certified as a member of the group, Serial Number is the certificate serial number per issuer. PNRP allows every issuer to keep its own numbering scheme. Preferably, certificate serial numbers are globally unique (GUID), unless the computer does not have a network card. The Validity refers to the period of validity expressed in a pair of From-To dates, $P_{ID}$ is the public key from which the ID was derived, and $P_{Issuer}$ is the public key of the certificate issuer. If the certificate issuer is the same as the ID owner then this field can be left blank and it will be assumed that $P_{Issuer}=P_{ID}$. $K_{Issuer}$ is the private key pair of $P_{Issuer}$. If the certificate issuer is the ID owner then this is $K_{ID}$, the private key pair of the ID owner.

This group membership certificate may be used to verify that the specified Peer ID is a member of the group with the specified group ID. This information is signed with the private key of the issuer $K_{Issuer}$. Depending on the group security policy selected, any group member or only a smaller set called group owners can be certificate issuers. In all cases, however, to verify that the issuer is certified to issue such certificates a chain of group membership certificates has to exist that leads to a certificate signed with the group private key.

Figure 2:
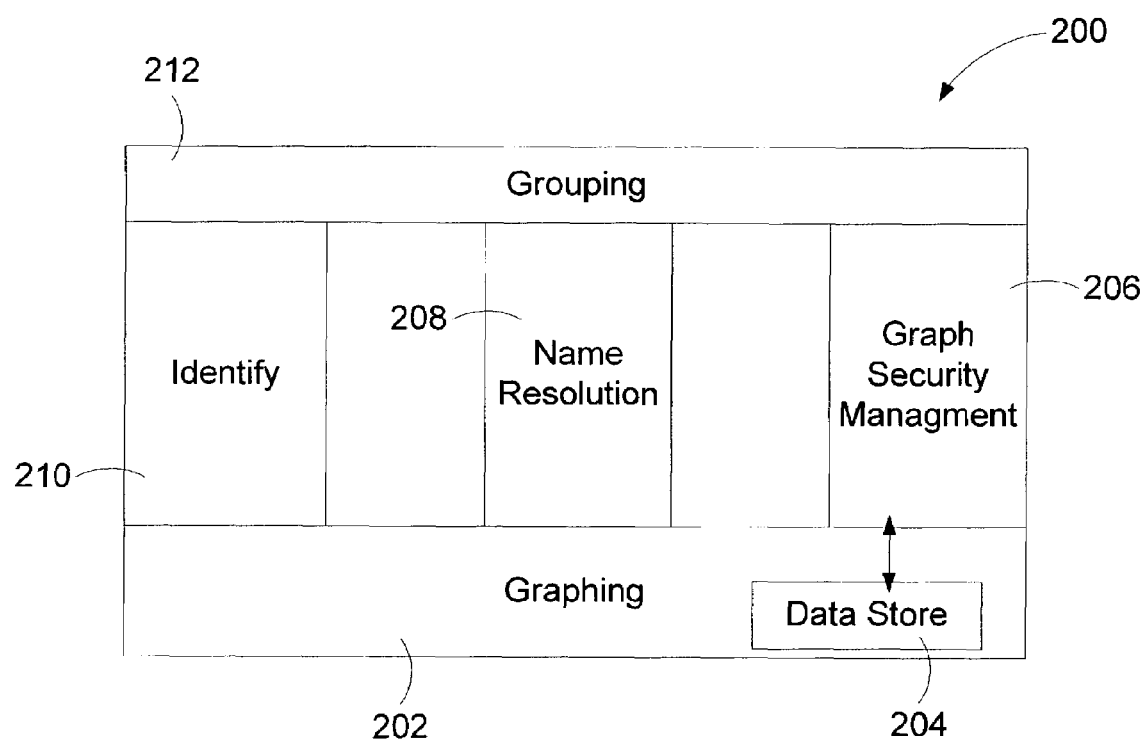
FIG. 2 is a simplified framework diagram illustrating a peer-to-peer (P2P) interface framework into which the system and methods of the present invention find particular applicability.

Having now provided one P2P environment to which the identity management system and method of the present invention finds particular applicability, attention is now directed to FIG. 2. This FIG. 2 illustrates an exemplary P2P framework 200 in which the present invention may exist, although it is not limited for use with only such frameworks. Indeed, the identity management system and methods of the present invention may be used with various frameworks which need or desire a coordinated, logical set of interfaces that allow complete management of P2P identities. Of course one skilled in the art will recognize that various application programs can utilize the APIs of the present invention to provide a rich user interface and a set of functions that allow management of the various user identities that may be desired in the P2P environment.

As illustrated in this FIG. 2, the underlying P2P graphing interfaces 202 utilize a data store 204 that contains all of the information needed in the P2P framework 200. A description of one embodiment of these graphing interfaces 202 is contained in co-pending application Ser. No. 10,309,865, entitled Peer-To-Peer Graphing Interfaces and Methods, filed on even date herewith, the teachings and disclosure of which are hereby incorporated in their entireties by reference thereto. The information in the data store is also utilized by a P2P graph security management interface 206 that provides the security necessary for productive participation in a P2P graph. Some form of P2P name to address resolution 208 must also typically be provided to allow the P2P system to function. As discussed above, one such system is the PNRP system described in the above identified co-pending applications. The identity interfaces 210 of the present invention are also included in this framework 200, as will be discussed more fully below. Finally in this exemplary framework 200, a set of grouping interfaces 212 are provided to allow proper participation in P2P groups.

Turning now specifically to the identity management interfaces 210 provided by the system and methods of the present invention, this group of APIs is exposed to the application writers in order to create, enumerate and manipulate peer identities. Identities exposed in this API 210 may be provided as input parameters to the grouping 212 and discovery 208 APIs.

A first function of the interface 210 of the present invention is a peer identity create function. This function creates a new peer identity and returns its name. The name of the identity is passed in the subsequent calls to identify this newly created identity. If the function fails to create an identity, the name of the identity returned is NULL.

The parameters of this function are a classifier, a friendly name, the cryptographic key provider, and the location to which the identity should be returned. The classifier can be NULL, but is otherwise appended to the published identity name to make it more user friendly. The friendly name may be chosen by the user for this identity. While it is recommended, the friendly name does not have to be unique. If the user does not specify a friendly, the function uses the P2P name of the identity as its friendly name. The cryptographic key provider is actually preferably a handle to the container where the key pair exists. If this parameter is NULL then a new public/private key pair is generated for this identity. This key pair and the classifier are used to generate peer name of the new identity. Once identity is created, it automatically gets persisted on the disk to the location indicated by this parameter. This identity name should be used in subsequent calls to the API.

The return values for this interface include an indication of success or of a particular error encountered. These error messages include an indication that the handle to the key specified is not valid, that the identity already exists, that the disk volume does not have enough space to accommodate information for the new identity, that there is not enough memory to perform the operation, that one of the parameters is invalid, or that the keys do not exist in the specified container.

The API of the present invention also provides functionality to retrieve and set the friendly name for use by a user in the establishment or management of a peer identity. The parameters for the get friendly name function are, by way of input, the identity name for which the friendly name is desired and, by way of output, a pointer to the location where the friendly name of the identity should be returned. The set friendly name function or interface modifies the currently friendly name associated with the identity. The parameters for the set friendly name function are the identity name for which the friendly name is to be set, and a string containing the new friendly name of the peer identity. This new friendly name can be NULL or an empty string, in which case the old friendly name is deleted and the new friendly name will be the peer name of the identity as discussed above. Preferably, the string is a Unicode string to allow for global compatibility.

The return values for these interfaces include an indication of success or of a particular error encountered. These error messages include an indication that there is not enough memory to perform the operation, that one of the parameters is invalid, or that the identity with the specified name cannot be found.

The interface of the present invention also provides a get cryptographic key function. This function returns a handle to the private/public key pair which is associated with the identity. Caller is responsible for freeing a reference to the container when the caller no longer needs the key. The parameters for this function are the identity name for the peer identity for which the key pair is desired, and a pointer to the location where a handle to the key container should be returned. The return values for this interface includes an indication of success or of a particular error encountered. These error messages include an indication that there is not enough memory to perform the operation, that one of the parameters is invalid, or that the identity with the specified name cannot be found.

The interface of the present invention also provides functionality to delete peer identities as well. Preferably, this function permanently deletes the identity, including all certificates, private keys and group information associated with the identity. The return values for this interface includes an indication of success or of a particular error encountered. These error messages include an indication that there is not enough memory to perform the operation, that one of the parameters is invalid, or that the identity with the specified name cannot be found.

The management API of the present invention also preferably includes export functionality once the peer identity has been created. This function exports an identity to a data structure, and encrypts it with a supplied password. Flags can specify different export options, such as exporting all groups, exporting only groups owned by the identity, exporting only groups not owned by the identity, exporting just specified groups, exporting only identity information without associated group information, or exporting all the keys along with the appropriate certificates to which they are attached. Options flags also specify whether to export private keys.

The parameters of this export function are the name of the peer identity to be exported, the password to be used to encrypt identity information (including identity private key if it is specified for export), the export option flags, the count of elements in the list of groups in the export list if the export specified groups flag is set, an array of group names to be exported, and a pointer to the location where the exported data will be placed. The return values for this interface includes an indication of success or of a particular error encountered. These error messages include an indication that there is not enough memory to perform the operation, that one of the export flags specified is not valid, that one of the parameters is invalid, or that the identity or group with the specified name cannot be found.

A complementary function in the management of peer identities is the peer identity import function. This function imports identity information in the form of the encrypted data structure discussed above with respect to the export function. Different import options can be specified by setting various parameter flags. Such flags allow for the importation of all groups associated with the identity, the importation of only groups owned by the identity, the importation of only groups not owned by the identity, the importation of only specified groups, the importation of only identity information without associated group information, the importation of the private keys associated with the identity, that information should be overwritten only by newer information during the importation, that information should always be overwritten, or that information should never be overwritten.

The parameters for this function are a pointer to the data structure that contains the information being imported, the password to be used to decrypt the identity information (including the identity private key if it is specified for import, any combination of the export flags discussed above, and a pointer to the location where the name of the imported identity is returned. If this parameter is NULL, the name of the identity is not returned. The return values for this interface includes an indication of success or of a particular error encountered. These error messages include an indication that there is not enough memory to perform the operation, that one of the parameters is invalid, that the imported data is not properly formatted or corrupted so it cannot be imported, or that the identity export do not overwrite flag is specified and the identity being imported already exists.

The system of the present invention also provides the ability to enumerate all of the peer identities. This function creates an enumeration handle that can be used to enumerate through all the identities belonging to the particular user. The parameter for this function is a pointer to the location where the handle to the enumeration object is returned. Enumeration object should be used in the subsequent call to enumerate through the identities. The return values for this interface includes an indication of success or of a particular error encountered. These error messages include an indication that there is not enough memory to perform the operation or that one of the parameters is invalid.

Also available is a function to enumerate the groups associated with the peer identities. This function creates an enumeration handle that can be used to enumerate through all the groups associated with a particular identity. The parameters for this function are the name of the identity for which groups will be enumerated, and a pointer to the location where the handle to the enumeration object is returned. The enumeration object should be used in the subsequent calls to enumerate through the groups belonging to the specified identity. The return values for this interface includes an indication of success or of a particular error encountered. These error messages include an indication that there is not enough memory to perform the operation, that one of the parameters is invalid, or that the identity with the specified name cannot be found.

The interface of the present invention also preferably provides a function that retrieves the security information for the identity in the form of an XML fragment. In order for the identity to join a group, it needs to export information about itself and pass it to the existing group member who would be able to issue an invitation. In essence, all necessary information about the identity is encapsulated in the identity certificate (IDC). In order to adhere to modern data exchange standards, this binary structure will be encoded and presented as an XML fragment. This XML fragment will be generated by this function.

Applications are preferably not allowed to add tags within the peer identity information tag or modify this XML fragment in any way. Applications are allowed to incorporate this XML fragment into other XML documents, but they are obligated to strip out all their XML before passing this into the API that creates an XML group invitation. This XML fragment should be used when invitation to join the group is issued to this identity. If an application incorporates this fragment into the larger XML document, it should strip out surrounding XML and then parse this structure into the peer group create invitation. Applications are not allowed to modify the fragment itself.

The parameters for this function are the peer name of the identity for which information is retrieved, and a pointer to the location where the Unicode string containing the XML fragment with the information about the identity is returned. The return values for this interface include an indication of success or of a particular error encountered. These error messages include an indication that there is not enough memory to perform the operation, that one of the parameters is invalid (if the XML identity information is NULL), or that the handle to the identity is invalid.

Finally, the interface of the present invention provides a function that creates a new peer name based on the existing name of the identity and supplied classifier. Creation of the identity name does not imply creation of the identity itself. The parameters for this function are the name of the identity that should be taken as a basis for the new peer name, a string containing a new classifier that needs to be appended to the existing name of the identity, and a pointer to the location where the new peer name will be returned. The return values for this interface include an indication of success or of a particular error encountered. These error messages include an indication that there is not enough memory to perform the operation, that one of the parameters is invalid, or that the identity with the specified name cannot be found.

In one embodiment of the interfaces and methods of the present invention that is particularly well suited for the Microsoft Windows XP operating system, the APIs may be as follows:

```
HRESULT WINAPI  PeerIdentityCreate(
                IN     PCWSTR              pwzClassifier,
                IN     PCWSTR              pwzFriendlyName,
                IN     HCRYPTPROV          hCryptProv,
                OUT    PWSTR         *     ppwzIdentity);
HRESULT WINAPI  PeerIdentityGetFriendlyName(
                IN     PCWSTR              pwzIdentity,
                OUT    PWSTR         *     ppwzFriendlyName);
HRESULT WINAPI  PeerIdentitySetFriendlyName(
                IN     PCWSTR              pwzIdentity,
                IN     PCWSTR              pwzFriendlyName);
HRESULT WINAPI  PeerIdentityGetCryptKey(
                IN     PCWSTR              pwzIdentity,
                OUT    HCRYPTPROV    *     phCryptProv);
```

-continued

```
HRESULT WINAPI  PeerIdentityDelete(
                    IN    PCWSTR              pwzIdentity);
HRESULT WINAPI  PeerIdentityExport(
                    IN    PCWSTR              pwzIdentity,
                    IN    PCWSTR              pwzPassword,
                    IN    DWORD               dwFlags,            // PEER_XPORT_FLAGS
                    IN    ULONG               cGroupNames,
                    IN    PCWSTR *            ppwzGroupNames,
                    OUT   PPEER_DATA    *     ppData);
HRESULT WINAPI  PeerIdentityImport(
                    IN    PPEER_DATA          pData,
                    IN    PCWSTR              pwzPassword,
                    IN    DWORD               dwFlags,            // PEER_XPORT_FLAGS
                    OUT   PCWSTR        *     ppwzIdentity);
HRESULT WINAPI  PeerEnumIdentities(
                    OUT   HPEERENUM     *     phPeerEnum);
HRESULT WINAPI  PeerEnumGroups(
                    IN    PCWSTR              pwzIdentity,
                    OUT   HPEERENUM     *     phPeerEnum);
HRESULT WINAPI  PeerCreatePeerName(
                    IN    PCWSTR              pwzIdentity,
                    IN    PCWSTR              pwzClassifier,
                    OUT   PWSTR         *     ppwzPeerName);
HRESULT WINAPI  PeerIdentityGetXML(
                    IN    PCWSTR              pwzIdentity,
                    OUT   PWSTR*              ppwzIdentityXML);
```

The foregoing description of various embodiments of the invention has been presented for purposes of illustration and description. It is not intended to be exhaustive or to limit the invention to the precise embodiments disclosed. Numerous modifications or variations are possible in light of the above teachings. The embodiments discussed were chosen and described to provide the best illustration of the principles of the invention and its practical application to thereby enable one of ordinary skill in the art to utilize the invention in various embodiments and with various modifications as are suited to the particular use contemplated. All such modifications and variations are within the scope of the invention as determined by the appended claims when interpreted in accordance with the breadth to which they are fairly, legally, and equitably entitled.

What is claimed is:

1. A computer-readable storage medium embodying a program of instruction executable by a computer for performing a method of communicating between an application program of a resolution protocol and a server process on a same node to manage peer-to-peer identities, comprising the steps of:
providing, on the same node, an application program interface for use by the application program of the resolution protocol to manage peer-to-peer identities;
receiving, at the server process on the same node, via the application program interface, a peer identity create call having a plurality of call parameters comprising a classifier, a peer-to-peer friendly name, a handle to a container in which a key pair exists, and a pointer to a location to which an identity name should be returned, wherein the key pair includes a private key and a public key, and
wherein the key pair and the classifier are used to generate the identity name;
parsing, at the server process, the peer identity create call to retrieve the plurality of call parameters; and
returning to the application program a value indicative of the success/failure of the peer identity create call.

2. The computer-readable storage medium of claim 1, wherein the step of receiving the peer identity create call having the plurality of call parameters comprises the step of receiving a peer identity create call having a plurality of call parameters comprising a classifier, a peer-to-peer friendly name, a handle to the container in which a key pair exists that is set to NULL, and a pointer to a location to which an identity name should be returned, the method further comprising the step of issuing a generate new public/private key pair call.

3. The computer-readable storage medium of claim 1, wherein the step of returning to the application program the value indicative of the success/failure of the peer identity create call comprises a step of returning an error indicative that the handle is invalid.

4. The computer-readable storage medium of claim 1, wherein the step of returning to the application program the value indicative of the success/failure of the peer identity create call comprises a step of returning an error indicative that the identity name already exists.

5. The computer-readable storage medium of claim 1, wherein the step of returning to the application program the value indicative of the success/failure of the peer identity create call comprises a step of returning an error indicative that a disk volume is insufficient to store information for a peer identity corresponding to the identity name.

6. The computer-readable storage medium of claim 1, wherein the step of returning to the application program the value indicative of the success/failure of the peer identity create call comprises a step of returning an error indicative that there is not enough memory to perform the peer identity create call.

7. The computer-readable storage medium of claim 1, wherein the step of returning to the application program the value indicative of the success/failure of the peer identity create call comprises a step of returning an error indicative that at least one of the plurality of call parameters is invalid.

8. The computer-readable storage medium of claim 1, wherein the step of returning to the application program the value indicative of the success/failure of the peer identity create call comprises a step of returning an error indicative that no keys exist in the container.

9. A computer-readable storage medium embodying a program of instruction executable by a computer for performing a method of communicating between an application program of a resolution protocol and a server process on a same node to manage peer-to-peer identities, comprising the steps of:
  providing, at the same node, an application program interface for use by the application program of the resolution protocol to manage peer-to-peer identities;
  receiving, at the server process on the same node, via the application program interface, a peer create peer name call having a plurality of call parameters comprising an identity name that is to be taken as a basis for a new peer name, a string containing a new classifier that needs to be appended to an existing name of the identity, and a pointer to a location to which the new peer name is returned,
    wherein the identity name is generated from an existing classifier and a key pair, and wherein the key pair includes a public key and a private key;
  parsing, at the server process, the peer create peer name call to retrieve the plurality of call parameters; and
  returning to the application program a value indicative of the success/failure of the peer create peer name call.

10. The computer-readable storage medium of claim 9, wherein the step of returning to the application program the value indicative of the success/failure of the peer create peer name call comprises a step of returning an error indicative that a peer identity specified by the identity name cannot be found.

11. The computer-readable storage medium of claim 9, wherein the step of returning to the application program the value indicative of the success/failure of the peer create peer name call comprises a step of returning an error indicative that there is not enough memory to perform the peer create peer name call.

12. The computer-readable storage medium of claim 9, wherein the step of returning to the application program the value indicative of the success/failure of the peer create peer name call comprises a step of returning an error indicative that at least one of the plurality of call parameters is not valid.

* * * * *

UNITED STATES PATENT AND TRADEMARK OFFICE
CERTIFICATE OF CORRECTION

PATENT NO. : 7,613,812 B2 Page 1 of 1
APPLICATION NO. : 10/309864
DATED : November 3, 2009
INVENTOR(S) : Manion et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1111 days.

Signed and Sealed this

Nineteenth Day of October, 2010

David J. Kappos
*Director of the United States Patent and Trademark Office*